United States Patent [19]

Hardy

[11] Patent Number: 4,719,029

[45] Date of Patent: Jan. 12, 1988

[54] SOLUBLE OIL EMULSIFIER WITH BIORESISTANCE

[75] Inventor: Bryant J. Hardy, Ponca City, Okla.

[73] Assignee: Conoco Inc., Ponca City, Okla.

[21] Appl. No.: 3,674

[22] Filed: Jan. 15, 1987

[51] Int. Cl.$^4$ ............................................. C10M 135/08
[52] U.S. Cl. ....................................... 252/78.1; 252/75; 252/312; 252/353; 252/355; 252/DIG. 4; 252/32.7 R; 514/709; 514/711; 568/30
[58] Field of Search .................... 252/32.7 R, 75, 78.1, 252/312, 353, 355, DIG. 4; 514/709, 711; 568/30

[56] References Cited

U.S. PATENT DOCUMENTS 3,391,750  7/1968  Zika ..................................... 252/353
3,435,039  3/1969  Wakeman et al. ................... 252/106
3,508,612  4/1970  Reisberg et al. ................. 252/8.554
3,950,258  4/1976  Imai et al. ............................. 252/75
4,466,909  8/1984  Stayner ........................... 252/32.7 E

*Primary Examiner*—Robert Wax
*Attorney, Agent, or Firm*—Cortlan R. Schupbach

[57] ABSTRACT

The ammonium salt of a sulfated ethoxylated alcohol is used as an emulsifying agent to provide resistance to biological degradation of continuous water phase hydraulic fluids. The emulsification agent allows the necessary emulsification properties and in addition provides bioresistance such that there is no need to add a secondary biocide nor to correct emulsification characteristics in order to hold such materials stable in emulsion.

7 Claims, No Drawings

SOLUBLE OIL EMULSIFIER WITH BIORESISTANCE

This invention relates to water based hydraulic fluids which are resistant to biological degradation. More specifically, this invention relates to water based hydraulic fluids resistant to biological degradation, formed using an emulsifier having biological properties. The ammonium sulfate of a sulfated ethoxylated alcohol used as an emulsifier additive to an oil concentrate provides bioresistance when mixed with water to form a continuous water phase hydraulic fluid.

Bioresistant materials are known in the art. Representative but non-exhaustive examples of such art include U.S. Pat. No. 3,435,039 which discloses ammonium salts of alcohol ether salts as having germicidal properties in various organic solvents. However, this reference does not disclose the use of these compounds as emulsifiers for hydraulic fluids formed from an oil concentrate and water and having a continuous water phase. U.S. Pat. No. 3,508,612 discloses the use of ammonium salts of sulfated oxyalkylated organic compounds as a pretreatment for water flooding. This reference does not disclose the use of such compounds in continuous water phase hydraulic fluids nor their use as emulsifiers and for providing bioresistance in such materials.

Conventional hydraulic fluids are petroleum oils which form excellent fluids for hydraulic functions when properly formulated with suitable corrosion inhibitors, anti-oxidants, extreme pressure additives and the like. Properly formulated oils are excellent hydraulic fluids. However, all petroleum oils have the drawback of being extremely flammable. Serious fires have been caused by hydraulic lines rupturing and the subsequent release of oil under high pressure onto molten metal or hot exhaust systems, electrical wires or the like. This serious hazard has led industry and government to initiate programs for changing conventional hydraulic fluids to fire resistant hydraulic fluids. Such fluids are now in use, particularly in coal mines but also in various other obvious industrial applications. In an attempt to overcome the flammability of such fluids, petroleum hydraulic fluids have been emulsified with water in varying amounts. When the oil phase comprises the continuous phase, the emulsion is considered to be a water-in-oil emulsion. Such emulsions, however, are somewhat more flammable than the oil-in-water emulsions, in which water forms the continuous phase. It is not sufficient to merely emulsify a petroleum oil with water, since such emulsions generally fail to yield an emulsion of adequate lubricating qualities or stability, especially at high pressures. However, the problem of lubricity has largely been solved, as referenced by U.S. Pat. No. 3,281,356. This patent discloses a composition and emulsions formed from said compositions which provide excellent lubricity.

Oil in water emulsions are those designated as having a continuous water phase. Whether an emulsion has a continuous water phase can be determined by simply adding a drop of the emulsion to a vial of water. If the emulsion beads, the oil is in the continuous phase, whereas if the emulsion dissipates into the water immediately upon contact, water is the continuous phase. Water can be the continuous phase even when a majority of the emulsion is oil such as 60 percent oil/40 percent water. Determination of a water continuous phase can be made with reference to the simple test described.

The stability of such emulsions depends to a large extent upon the emulsifier package, but also depends upon the hardness of the water used in forming the emulsion. For example, in most underground mines, untreated water is used to make emulsions that serve as the hydraulic fluid in applications such as underground mining systems and underground roof support systems. Most of these mine waters are extremely hard, having a hardness in the range of 300 to 500 or even to 700 parts per million (ppm) as $CaCO_3$ or more. Use of such untreated mine waters can also introduce microbial organisms in to the emulsions. Microbial growth is a severe problem since inoculation of the hydraulic fluid with these organisms leads to rapid and explosive growth. Microorganisms grow extremely well in the conditions in which such fluids exist, i.e. a food supply which comes from the petroleum fraction, warmth, and a water phase in which to live. These fluids can become clogged with microorganism growth, causing many problems ranging from bad odor to complete separation into oil and water phases and filter plugging within the hydraulic system.

In order for continuous water phase hydraulic fluids to be acceptable in such uses, a biocide must be compatible with the oil concentrate and not cause separation or precipitation from the emulsion. Most prior art biocides have forced reformulation or extensive testing of compounds in order to maintain stability of the emulsions. This has led to increased cost and many problems in actual use. In addition, the biocide should not cause gelation in the oil concentrate under cold storage conditions and the concentrate should not produce an objectionable odor.

It would therefore be a great advantage to provide a bioresistant emulsion stabilizer for continuous water phase hydraulic fluids. It is a object of the present invention to provide a bioresistant emulsifier for continuous water phase hydraulic fluids. Other objects will become apparent to those skilled in this art as the description proceeds.

I have now discovered a method for imparting bioresistance to continuous water phase hydraulic fluids comprising using as an emulsifier for said continuous water phase hydraulic fluids an ammonium salt of a sulfated ethoxylated alcohol. Materials useful in the present invention have the general formula

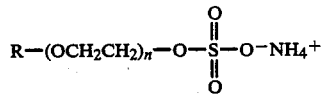

wherein n is from 2 to 10 preferably 2 to 4 and where R is a linear or branched alkyl group, or an aryl group, or a cyclic group containing from 6 to 30 carbon atoms. The preferred materials contain from 6 to 10 carbon atoms. The R group is ethoxylated to the desired level. Normally such ethoxylation will comprise from about 20 to about 70 percent by weight of the compound but from about 30 to about 50 percent by weight is preferred and from 40 to 50 weight percent ethylene oxide is most preferred.

Alcohols which can be ethoxylated prior to forming the ammonium salt have the general formula ROH, where R is a linear or branched alkyl group containing from 6 to 30 carbon atoms, or an aryl group or a cyclic group containing 6 to 30 carbon atoms. Representative but nonexhaustive examples of alcohols which can be alkoxylated prior to forming the ammonium salt according to the present invention are 1-dodecanol; 1-tridecanol; 1-tetradecanol, 1-pentadecanol; 1-hexadecanol; 1-heptadecanol; 1-octadecanol; 1-nonadecanol; 1-eicosanol; 2-methyl-1-undecanol; 2-propyl-1-nonanol; 2-butyl-1-octanol; 2-methyl-1-tridecanol; 2-ethyl-1-dodecanol; 2-propyl-1-undecanol; 2-butyl-1-decanol; 2-pentyl-1-nonanol; 2-hexyl-1-octanol; 2-methyl-1-pentadecanol; 2-ethyl-1-tetradecanol; 2-propyl-1-tridecanol; 2-butyl-1-dodecanol; 2-pentyl-1-undecanol; 2-hexyl-1-decanol; 2-hexyl-1-nonanol; 2-octyl-1-octanol; 2-methyl-1-heptadecanol; 2-ethyl-1-hexadecanol; 2-propyl-1-pentadecanol; 2-butyl-1-tetradecanol; 1-pentyl-1-tridecanol; 2-hexyl-1-dodecanol; 2-octyl-1-decanol; 2-nonyl-1-nonanol; 2-dodecanol; 3-dodecanol; 4-dodecanol; 5-dodecanol; 6-dodecanol; 2-tetra-decanol; 3-tetradecanol; 4-tetradecanol; 5-tetradecanol; 6-tetradecanol; 7-tetradecanol; 2-hexadecanol; 3-hexadecanol; 4-hexadecanol; 5-hexadecanol; 6-hexadecanol; 7-hexadecanol; 8-hexadecanol; 2-octadecanol; 3-octadecanol; 4-octadecanol; 5-octadecanol; 6-octadecanol; 7-octadecanol; 8-octadecanol 9-octadecanol; 9-octadecanol-1; 2,4,6-trimethyl-1-heptanol; 2,4,6,8-tetramethyl-1-nonanol; 3,5,5-trimethyl-1-hexanol; 3,5,5,7,7-pentamethyl-1-octanol; 3-butyl-1-nonanol; 3-butyl-1-undecanol; 3-hexyl-1-undecanol; 3-hexyl-1-tridecanol; 3-octyl-1-tridecanol; 2-methyl-2-undecanol; 3-methyl-3-undecanol; 4-methyl-4-undecanol; 2-methyl-2-tridecanol; 3-methyl-3-tridecanol; 4-methyl-3-tridecanol; 4-methyl-4-tridecanol; 3-ethyl-3-decanol; 3-ethyl-3-dodecanol; 2,4,6,8-tetramethyl-2-nonanol; 2-methyl-3-undecanol; 2-methyl-4-undecanol; 4-methyl-2-undecanol; 5-methyl-2-undecanol; 4-ethyl-2-decanol; 4-ethyl-3-decanol. Polyhydric alcohols can also be used. The alcohols are ethoxylated and then reacted to form the ammonium sulfate salt. Representative but nonexhaustive examples of suitable polyhydric alcohols are ethylene glycol; 1,2-propylene glycol; 1,4-butanediol; 1,6-hexanediol; 1,10-decanediol; 1,3-butylene glycol; diethylene glycol; diethylene glycol monobutyl ether; diethylene glycol monomethyl ether; diethyl glycol monoethyl ether; dipropylene glycol; dipropylene glycol monomethyl ether; ethylene glycol monomethyl ether; ethylene glycol monoethyl ether; ethylene glycol monobutyl ether; hexylene glycol; 1,4-dimethylolcyclohexane; 2-ethyl-1,3-hexanediol; triethylene glycol; tetraethylene glycol; glycerol.

When the emulsifiers of the present invention are used at a concentrate level of about 1 to about 5 weight percent by weight or in an emulsifier-water continuous phase hydraulic fluid concentration of from about 5 to about 15 parts per million (ppm) that the resistance to biological degradation was enhanced over an emulsifier package which did not include these ether sulfates.

Although theoretical in nature, and I do not wish to be bound thereby, I believe that the bioresistance comes from the alcohols themselves. The large advantage of the present invention is that the biological resistance is inherent in the emulsifier, eliminating the need to add a secondary biological agent which may effect emulsion stability and costs. It is not necessary to emulsify or hold into solution a second biocide which provides no emulsification. Further, the sulfate salts are unique in that the emulsification and bioresistance are suitable for oil-in-water hydraulic fluids. Other ammonium salts, such as the better known halide salts, do not provide any emulsification advantage and in fact tend to destabilize the finished hydraulic fluid.

The instant invention is more concretely described with reference to the examples below wherein all parts and percentages are by weight unless otherwise specified. The examples are provided to illustrate the present invention and not to limit it.

EXAMPLE 1

A test formula was devised as set forth below

| Example 1 | Wt. % | |
|---|---|---|
| | Base Case | Emulsifier |
| 100 SSU Naphthenic Oil | 79.40 | 76.9 |
| Sodium Sulfonate | 10.5 | 10.5 |
| Tall Oil | 6.0 | 6.0 |
| Triethanolamine | 1.7 | 1.7 |
| KOH (45%) | 1.5 | 1.5 |
| Hexylene Glycol | 0.9 | 0.9 |
| Emulsifier | — | 2.5 |

In the test formula, tall oil was Pamak 25, trademark of and sold by Hercules Incorporated. The naphthenic oil used is commercially available from Exxon Inc. as an extracted naphthenic oil. The emulsifier used was a standard ether sulfate formed from a 6 to 10 carbon atom alcohol ethoxylated to a 50 percent level, they further reacted to form the ammonium sulfate salt of the 6 to 10 carbon atom alcohol ether sulfate. The emulsifier used is commercially available as Steposal CA207, trademark of and sold by Stepan Chemical Co.

The concentrates formed as described in the Example formulation were diluted to a 5 percent emulsion in water. When diluted to this point of use, the concentrates formed a milky, opaque oil-in-water emulsion. These compositions were chosen because in normal use environments this type of product is very susceptible to microbial contamination by dirt, metal shavings, tramp water and the like and rapidly supports microbial growth. Previous tests have shown that such formulations rapidly deteriorate as the result of severe microbial growth.

In the tests carried out, both inoculated and control examples in duplicate were prepared according to the following procedure.

Each sample was divided into four 200 milliliter (ml) aliquots and dispersed into clean glass bottles. Two samples of each fluid were then inoculated with microorganisms previously cultured from spoiled hydraulic fluid samples. The two remaining aliquots of each fluid were not inoculated and served as controls. Several dilution bottles containing nutrient broth were then used to enumerate bacterial populations at 1 and 168 hour periods after inoculation. The results are set forth in Table 1.

TABLE 1

| Water Based Hydraulic Fluids | | |
|---|---|---|
| | Bacterial Growth | |
| | 1 Hour | 7 Days |
| Standard Emulsifier System | | |
| Control-1 | 100,000 | 1,000,000 |
| Control-2 | 100,000 | 1,000,000 |
| Inoculated-1 | 1,000,000 | 100,000,000 |
| Inoculated-2 | 1,000,000 | 100,000,000 |
| Emulsifier System Containing Ammonium Sulfate of Alcohol Ether Sulfates | | |

TABLE 1-continued

| Water Based Hydraulic Fluids | | |
|---|---|---|
| | Bacterial Growth | |
| | 1 Hour | 7 Days |
| Control-1 | 1,000 | 1,000 |
| Control-2 | 1,000 | 1,000 |
| Inoculated-1 | 1,000,000 | 10,000,000 |
| Inoculated-2 | 1,000,000 | 10,000,000 |

EXAMPLE 2

The emulsion characteristics of the bioresistant emulsifier described in Example 1 was compared with a standard formulation. The emulsifier used replaced an equal amount of the oil used to form the concentrate. The formulation and results are set forth in Table 2, where all components are as described in Example 1.

TABLE 2

| | Wt. % | |
|---|---|---|
| Example 1 | Base Case | Emulsifier |
| 100 SSU Naphthenic Oil | 79.40 | 76.90 |
| Sodium Sulfonate | 10.5 | 10.5 |
| Tall Oil | 6.0 | 6.0 |
| Triethanolamine | 1.7 | 1.7 |
| KOH (45%) | 1.5 | 1.5 |
| Hexylene Glycol | 0.9 | 0.9 |
| Emulsifier | — | 2.5 |

| (Milliliters) | Ambient | 158° F. | Ambient | 158° F. |
|---|---|---|---|---|
| Emulsion Stability (250 PPM Hardness Water) | | | | |
| Oil | — | .05 | — | — |
| Oil Rich | — | .05 | — | — |
| Cream | 0.50 | .40 | .025 | — |
| Emulsion | 104.5 | 104.5 | 104.975 | 104.9 |
| Emulsion Stability (750 PPM Hardness Water) | | | | |
| Oil | .30 | .30 | — | .35 |
| Oil Rich | — | .05 | | 0.10 |
| Cream | .05 | .10 | .025 | 0.20 |
| Emulsion | 104.65 | 104.55 | 104.60 | 103.70 |

The Table 2 results show excellent hard water stability (calculated as CaCO₃) even at 158° F. The tests used are the standard emulsion tests and procedures set forth by the English National Coal Board in NCB Specification No. 463/1970, "Emulsifying Oils for Dilute Emulsions in Powered Supports".

The tests show that if the emulsions separate for any reason, i.e. into oil or "cream", a breakdown of the emulsion and filter clogging of roof supports and the like would be expected. In these tests, a total oil rich and cream of 0.5 is considered a viable emulsion.

Thus the present invention provides an emulsifier having both bioresistance while providing good hard water stability.

While certain embodiments and details have been shown for the purpose of illustrating the present invention, it will be apparent to those skilled in this art that various changes and modifications may be made herein without departing from the spirit or scope of the invention.

I claim:

1. A method for imparting bioresistance to continuous water phase hydraulic fluids comprising utilizing as an emulsifier for said continuous water phase hydraulic fluid an ammonium salt of a sulfated ethoxylated alcohol wherein the alcohol contains from 6 to 20 carbon atoms and which has been ethoxylated to a level of from about 20 percent by weight to about 90 percent by weight, based upon the weight of the ethoxylated alcohol.

2. A method as described in claim 1 wherein the emulsifier is used at a concentration of from about 0.5 percent to about 5 percent by weight of the oil concentrate used with water to form the continuous water phase hydraulic fluid.

3. A method as described in claim 2 wherein the water phase contains up to 750 parts (magnesium and calcium) hardness calculated as CaCO₃.

4. A method as described in claim 3 wherein the ethoxylated alcohol is formed from a straight chain, branched chain, aryl or polyhydric alcohol.

5. A method as described in claim 4 wherein the alcohol is a least one alcohol selected from the group consisting of 1-dodecanol; 1-tridecanol; 1-tetradecanol, 1-pentadecanol; 1-hexadecanol; 1-heptadecanol; 1-octadecanol; 1-nonadecanol; 1-eicosanol; 2-methyl-1-undecanol; 2-propyl-1-nonanol; 2-butyl-1-octanol; 2S-methyl-1-tridecanol; 2-ethyl-1-dodecanol; 2S-propyl-1-undecanol; 2-butyl-1-decanol; 2-pentyl-1-nonanol; 2-hexyl-1-octanol; 2-methyl-1-pentadecanol; 2-ethyl-1-tetradecanol; 2-propyl-1-tridecanol; 2-butyl-1-dodecanol; 2-pentyl-1-undecanol; 2-hexyl-1-decanol; 2-hexyl-1-nonanol; 2-octyl-1-octanol; 2-methyl-1-heptadecanol; 2-ethyl-1-hexadecanol; 2-propyl-1-pentadecanol; 2-butyl-1-tetradecanol; 1-pentyl-1-tridecanol; 2-hexyl-1-dodecanol; 2-octyl-1-decanol; 2-nonyl-1-nonanol; 2-dodecanol; 3-dodecanol; 4-dodecanol; 5-dodecanol; 6-dodecanol; 2-tetra-decanol; 3-tetradecanol; 4-tetradecanol; 5-tetradecanol; 6-tetradecanol; 7-tetradecanol; 2-hexadecanol; 3-hexadecanol; 4-hexadecanol; 5-hexadecanol; 6-hexadecanol; 7-hexadecanol; 8-hexadecanol; 2-octadecanol; 3-octadecanol; 4-octadecanol; 5-octadecanol; 6-octadecanol; 7-octadecanol; 8-octadecanol 9-octadecanol; 9-octadecanol-1; 2,4,6-trimethyl-1-heptanol; 2,4,6,8-tetramethyl-1-nonanol; 3,5,5-trimethyl-1-hexanol; 3,5,5,7,7-pentamethyl-1-octanol; 3-butyl-1-nonanol; 3-butyl-1-undecanol; 3-hexyl-1-undecanol; 3-hexyl-1-tridecanol; 3-octyl-1-tridecanol; 2-methyl-2-undecanol; 3-methyl-3-undecanol; 4-methyl-4-undecanol; 2-methyl-2-tridecanol; 3-methyl-3-tridecanol; 4-methyl-3-tridecanol; 4-methyl-4-tridecanol; 3-ethyl-3-decanol; 3-ethyl-3-dodecanol; 2,4,6,8-tetramethyl-2-nonanol; 2-methyl-3-undecanol; 2-methyl-4-undecanol; 4-methyl-2-undecanol; 5-methyl-2-undecanol; 4-ethyl-2-decanol; 4-ethyl-3-decanol.

6. A method as described in claim 3 wherein the alcohol is ethoxylated to a level of from about 40 percent to about 50 percent by weight based upon the weight of the ethoxylated alcohol.

7. A method as described in claim 6 wherein the emulsifier imparting bioresistance has the formula

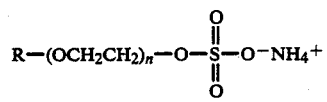

where R represents an alkyl having from 6 to 10 carbon atoms and n is from 2 to 4.

UNITED STATES PATENT AND TRADEMARK OFFICE
CERTIFICATE OF CORRECTION

PATENT NO. : 4,719,029

DATED : January 12, 1988

INVENTOR(S) : Bryant J. Hardy

It is certified that error appears in the above-identified patent and that said Letters Patent are hereby corrected as shown below:

Column 6, line 21, "2S-methyl-1-tridecanol" should be
-- 2-methyl-1-tridecanol --

Column 6, line 22, "2S-propyl-1-undecanol" should be
-- 2-propyl-1-undecanol --

Signed and Sealed this

Seventh Day of June, 1988

Attest:

DONALD J. QUIGG

Attesting Officer

Commissioner of Patents and Trademarks